(12) United States Patent
Lee et al.

(10) Patent No.: US 7,953,975 B2
(45) Date of Patent: May 31, 2011

(54) METHOD OF GENERATING ANTI-COLLUSION FINGERPRINT CODES USING $(N^a, N^{2a-2}, N^{a-1}, N, 0, 1)$ GD-PBIBD

(75) Inventors: Heung Kyu Lee, Seoul (KR); In Koo Kang, Daejon (KR); Sung Hyuk Park, Seoul (KR); Eun Mee Lee, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 937 days.

(21) Appl. No.: 11/850,068

(22) Filed: Sep. 5, 2007

(65) Prior Publication Data

US 2008/0056497 A1   Mar. 6, 2008

(30) Foreign Application Priority Data

Sep. 6, 2006   (KR) .................. 10-2006-0085421

(51) Int. Cl.
*H04L 9/32*   (2006.01)
(52) U.S. Cl. ............ 713/168; 713/185; 726/26; 726/27; 726/32; 708/520
(58) Field of Classification Search .................... 380/28, 380/277; 726/26, 27, 32; 713/185, 168; 708/520

See application file for complete search history.

(56) References Cited

U.S. PATENT DOCUMENTS

| | | | | |
|---|---|---|---|---|
| 7,814,564 | B2 * | 10/2010 | He et al. | 726/32 |
| 2006/0130148 | A1 * | 6/2006 | Kim et al. | 726/26 |

OTHER PUBLICATIONS

"An incomplete split-block design generated by GDPBIBD(s)", by Franz Hering and Stanislaw Mejza, Journal of Statiitical Planning and Inference, vol. 106, Issues 1-2, Aug. 1, 2002, pp. 125-134.*
"GD PBIBD(2)s in Incomplete Split-Plot x Split-Block Type Experiments", by Katarzyna Ambrozy and Iwona Mejza, Metodoloski zvezki, vol. 3, No. 1, 2006, 39-48.*
"Externded Group Divisible Partially Balanced Incomplete Block Designs", by Klaus Hinkelmann, Annals of Mathematical Statistics, vol. 35, No. 2 (1964), 681-695.*

* cited by examiner

*Primary Examiner* — Zachary A Davis
*Assistant Examiner* — Joseph Pan
(74) *Attorney, Agent, or Firm* — Adam K. Sacharoff; Much Shelist (57) ABSTRACT

Disclosed herein is a method of generating anti-collusion fingerprint codes using a $(n^a, n^{2a-2}, n^{a-1}, n, 0, 1)$ GD-PBIBD. The fingerprint codes are generated using computer equipment that executes a program for executing a program for generating the fingerprint codes. The method includes step 1 of receiving an arbitrary prime number n and an arbitrary integer a larger than 3, step 2 of generating an n×n index matrix, step 3 of generating n n×n type_i matrixes, step 4 of generating an $n^2 \times n^2$ matrix using the n×n index matrix and the n×n type_i matrixes, step 5 of generating an $n^a \times n^{2a-2}$ matrix, and step 6 of extracting one arbitrary column from the $n^a \times n^{2a-2}$ matrix.

11 Claims, 8 Drawing Sheets

|    | 1 | 2 | 3 | 4 | 5 | 6 | 7 | 8 | 9 |
|----|---|---|---|---|---|---|---|---|---|
| n1 | 0 |   |   | 0 |   |   | 0 |   |   |
| n2 |   | 0 |   |   | 0 |   |   | 0 |   |
| n3 |   |   | 0 |   |   | 0 |   |   | 0 |
| n4 | 0 |   |   |   |   | 0 |   | 0 |   |
| n5 |   | 0 |   | 0 |   |   |   |   | 0 |
| n6 |   |   | 0 |   | 0 | 0 |   |   |   |
| n7 | 0 |   |   |   | 0 |   |   |   | 0 |
| n8 |   | 0 |   |   |   | 0 | 0 |   |   |
| n9 |   |   | 0 | 0 |   |   |   | 0 |   |

Fig. 1A

|    | 1 | 2   | 3   |
|----|---|-----|-----|
| N1 | I | I   | I   |
| N2 | I | II  | III |
| N3 | I | III | II  |

| type | | | | | | | | | |
|---|---|---|---|---|---|---|---|---|---|
| 1st n | 1 | 1 | 1 | 2 | 2 | 2 | 3 | 3 | 3 |
| 2nd n | 1 | 2 | 3 | 2 | 3 | 1 | 3 | 1 | 2 |
| 3rd n | 1 | 3 | 2 | 2 | 1 | 3 | 3 | 2 | 1 |

Fig. 2C $A_{index} = $

| 1 | 1 | 1 | ... | 1 | 1 |
|---|---|---|---|---|---|
| 1 | 2 | 3 | ... | ... | n |
| 1 | 3 | 5 | ... | ... | n-1 |
| ... | ... | ... | ... | ... | ... |
| 1 | n-1 | ... | ... | ... | 3 |
| 1 | n | n-1 | ... | 3 | 2 |

Fig. 3

$B_{index} = $

| 1 | 1 | 1 | ... | 1 | 2 | 2 | 2 | ... | 2 | ... | ... | ... | ... | ... | n | n | n | ... | n |
|---|---|---|---|---|---|---|---|---|---|---|---|---|---|---|---|---|---|---|---|
| 1 | 2 | 3 | ... | n | 2 | 3 | 4 | ... | 1 | ... | ... | ... | ... | ... | n | 1 | 2 | ... | n-1 |
| 1 | 3 | 5 | ... | n-1 | 2 | 4 | 6 | ... | n | ... | ... | ... | ... | ... | n | 2 | 4 | ... | n-2 |
| ... | ... | ... | ... | ... | ... | ... | ... | ... | ... | ... | ... | ... | ... | ... | ... | ... | ... | ... | ... |
| 1 | n | n-1 | ... | 2 | 2 | 1 | n | ... | 3 | ... | ... | ... | ... | ... | n | n-1 | n-2 | ... | 1 |

Fig. 4

P = [grid] = | M₁ |
             | ... |
             | Mₙ |

Fig. 5 index matrix:
| 1 | 1 | 1 |
| 1 | 2 | 3 |
| 1 | 3 | 2 | type_i_matrixes:

Pasting:

|   |   |   | 0 |   |   | 0 |   |   | 0 |   |
|---|---|---|---|---|---|---|---|---|---|---|
|   |   | 0 |   |   | 0 |   |   |   | 0 |   |
|   |   |   | 0 |   |   |   | 0 |   |   | 0 |
| 0 |   |   |   |   |   |   | 0 | 0 |   |   |
|   |   | 0 | 0 |   |   |   |   |   |   | 0 |
|   |   |   | 0 |   | 0 |   | 0 |   |   |   |
| 0 |   |   |   |   | 0 |   |   |   |   | 0 |
|   |   | 0 |   |   |   |   | 0 | 0 |   |   |
|   |   |   | 0 | 0 |   |   |   |   | 0 |   |

Fig. 7

| 1 | 1 | ... | 1   |
|---|---|-----|-----|
| 1 | 2 | ... | n   |
| 1 | 3 | ... | n-1 |
| ...|...| ... | ... |
| 1 | n | ... | 2   |

,

| 2 | 2 | ... | 2 |
|---|---|-----|---|
| 2 | 3 | ... | 1 |
| 2 | 4 | ... | n |
| ...|...| ... |...|
| 2 | 1 | ... | 3 |

, ... ,

| n | n   | ... | n   |
|---|-----|-----|-----|
| n | 1   | ... | n-1 |
| n | 2   | ... | n-2 |
| ...| ...| ... | ... |
| n | n-1 | ... | 1   |

METHOD OF GENERATING ANTI-COLLUSION FINGERPRINT CODES USING ($N^a, N^{2a-2}, N^{a-1}, N, 0, 1$) GD-PBIBD

BACKGROUND OF THE INVENTION

1. Field of the Invention

The present invention relates generally to a method of generating anti-collusion fingerprint codes using ($n^a$, $n^{2a-2}$, $n^{a-1}$, n, 0, 1) GD-PBIBD. That is, the present invention relates to a digital fingerprinting method for protecting the copyrights of digital content or preventing the illegal distribution and use of digital content and, more particularly, to a method of generating fingerprint codes, which is a key technology in digital fingerprinting. By inserting fingerprint codes, generated by the present invention, into images, video and audio, which are digital media, copyrights can be protected, that is, the illegal use of digital content can be prevented, and a user connected with illegal distribution can be searched for in the event of illegal distribution of legal content.

2. Description of the Related Art

Digital fingerprinting is technology for preventing illegal distribution and subsequent use by inserting fingerprints, that is, unique information about purchasers who purchase digital content, such as text, images, video, audio, etc., into the digital content. Digital fingerprinting is technology that is used in such a manner as to insert a purchaser's unique fingerprint into content sold to the purchaser, extract the fingerprint from the content at the time of exposing the illegal distribution or use of the content, find the illegal distributor or user, and take legal action or another measure.

In digital fingerprinting, fingerprint information, modulated in a noise form, is inserted into original content, therefore the digital fingerprinting may be susceptible to various types of attacks in attempts to remove inserted fingerprints. In particular, in digital fingerprinting, the fingerprints of different users are inserted into the same original content, with the result that respective users have different pieces of content. As a result, two or more users can easily determine the differences between respective pieces of content by comparing the respective pieces of content, and inserted fingerprints can be easily removed using the differences.

Among the various attacks, an averaging attack is one of the most effective methods of weakening fingerprints that are inserted into content in a noise form. The averaging attack is a collusion attack that is most easily applicable to images or video to which the fingerprinting technique has been applied, and is an attack method of generating a new image or frame by averaging two or more images or video frames into which different fingerprints have been inserted. The averaging attack exhibits the effect of reducing fingerprints to an extent that is proportional to the number of pieces of content that are used in the attack. The overall intensity of an inserted fingerprint signal is reduced by the averaging attack, therefore purchaser information is not extracted, or erroneous information is extracted, at the time of extracting a fingerprint. To be immune to an averaging attack, a fingerprinting system must identify the purchasers involved in the attack and provide notification of information about the purchasers with respect to the content on which the averaging attack was made. Fingerprint information inserted for that purpose must be codes that are immune to an averaging attack.

In order to generate fingerprint codes immune to a conventional averaging attack, Group Divisible Partially Balanced Incomplete Block Design (GD-PBIBD), which pertains to the field of a set design theory, has been employed. Codes, generated based on the design theory, have features that are robust to averaging attacks due to the features of the design theory. However, in the generation of codes, only codes disclosed in documents have been used, therefore only a limited number of codes can be used due to the characteristics of document material, and the number of users that can be accommodated is considerably limited.

SUMMARY OF THE INVENTION

Accordingly, the present invention aims to develop a fingerprint code generation algorithm immune to an averaging attack and a fingerprint code generation method using the algorithm. The present invention proposes a unique algorithm for generating codes identical to codes that are generated using GD-PBIBD. An algorithm for generating GD-PBIBD codes is analyzed, and then codes are generated using a computer in a unique manner. As a result, the codes generated based on the present invention are digital fingerprints robust to an averaging attack, and the size of generated codes is not limited due to the features of the generation algorithm.

The present invention aims to develop a novel code generation algorithm and a fingerprint code generation method using the algorithm. Since examples of codes are disclosed in documents, the codes may be used as fingerprint codes. As described above, this approach has various limitations, therefore the present invention proposes a code generation algorithm and method using a computer. The algorithm capable of generating fingerprint codes using a computer has not existed in the past. The features of the GD-PBIBD design theory are mathematically analyzed, and the unique algorithm and method similar to the solution of a puzzle block game are developed based on the analysis.

In order to accomplish the above object, the present invention provides a method of generating anti-collusion fingerprint codes using a ($n^2$, $n^{2a-2}$, $n^{a-1}$, n, 0, 1) GD-PBIBD, the fingerprint codes being generated using computer equipment that executes a program for executing a program for generating the fingerprint codes, the method including step 1 of receiving an arbitrary prime number n and an arbitrary integer a larger than 3; step 2 of generating an n×n index matrix; step 3 of generating n n×n type_i matrixes; step 4 of generating an $n^2 \times n^2$ matrix using the n×n index matrix and the n×n type_i matrixes; step 5 of generating an $n^a \times n^{2a-2}$ matrix; and step 6 of extracting one arbitrary column from the $n^a \times n^{2a-2}$ matrix.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Preferred embodiments of the present invention will be described in detail below with reference to the accompanying drawings. The theoretical background thereof is discussed first.

I. Basic Mathematical Theory Used in Code Generation Algorithm

1. Features of Prime Numbers 1.1 A remainder function and a module are used, the description of which is given as follows:

For example, the remainder obtained by dividing 7 by 3 is 1. 7≡1 mod(3)

1.2 Zn={0, 1, 2, 3, . . . , and n−1}, in other words, a set of integers ranging from to n−1 is represented by Zn.

1.3 The remainders (mod) obtained by dividing natural numbers n by m have a one-to-one correspondence with the elements of Zm. That is, all of the natural numbers may be considered to be m partitions.

1.4 k that causes two different numbers p and q of Zm to satisfy pk≡qk (mod m) is only m.

Demonstration: If pk≡qk (mod m), pk-qk≡(p-q)k≡0 (mod m), that is, (p-q)|m and k|m. Meanwhile, the divisors of m are only 1 and m. Since p and q are different numerals of Zm, p-q cannot be a multiple of m, therefore k must be a multiple of m.

Figure 1A:
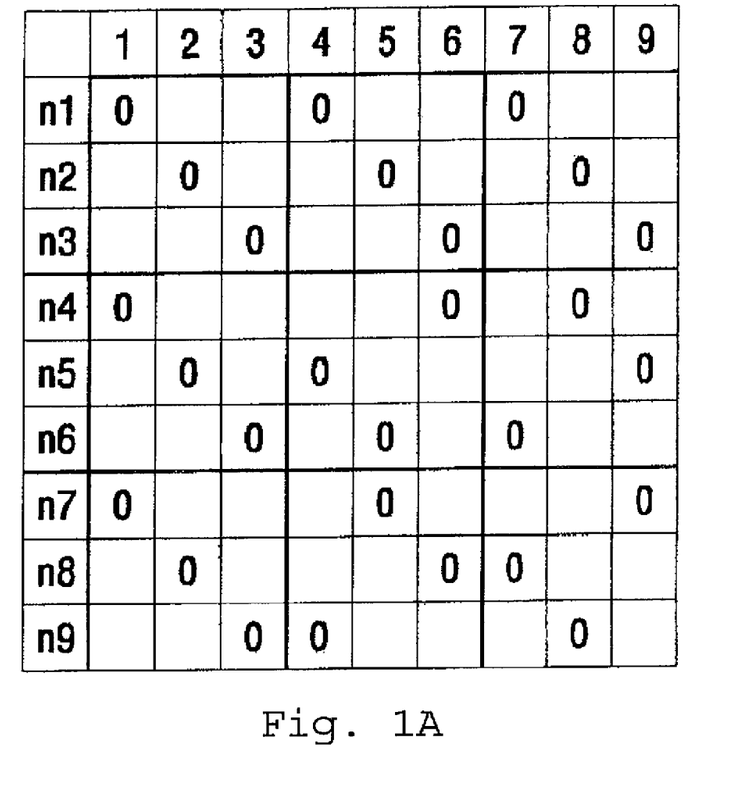
FIG. 1A is an actual example of a ($n^2$, $n^2$, n, n, 0, 1) design in the case where n=3.

2. Idea Behind Generation of $n^2 \times n^2$ Matrix 2.1 Generation of Index Matrix FIG. 1A shows an embodiment of a $(n^2, n^2, n, n, 0, 1)$-design when n=3.

n1, n2, . . . , and n9, which are the indices of respective rows, represent $n^2$ elements, while 1, 2, . . . , and 9, which are the indices of respective columns, represent $n^2$ generated ordered pairs having n elements.

Figure 1B:
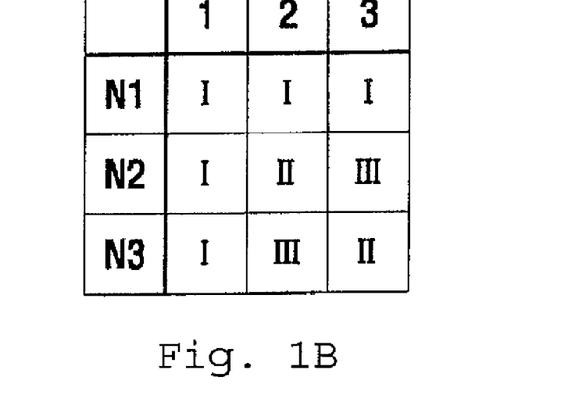
FIG. 1B is a diagram showing a 3×3 matrix into which generated ordered pairs are simplified.

FIG. 1B shows the generated ordered pairs that are simplified and represented using a 3×3 (n×n) matrix. The indices N1, N2, and N3 of respective rows respectively represent the elements of a group of n1-n3, the elements of a group of n4-n6, and the elements of a group of n7-n9, each of the indices 1, 2, and 3 represents three ordered pairs, and each of I, II, and III represents the corresponding 3×3 sub-matrices of FIG. 1A.

In order to simplify an algorithm, as in the above-illustrated table, matrices having similar patterns are used.

2.2. Generation of $n^2 \times n^2$ Matrix

A model will be generated for $\lambda_0=0$ and $\lambda_1=1$. That is, an arbitrary element of each group and one element of another group exist in the same column exactly once. As illustrated in the table given as an example (refer to FIG. 1A), the elements of n groups each having n elements are discussed below.

① Three ordered pairs may be formed by selecting the first, second and third elements of each of groups N1, N2, and N3.

② Thereafter, one ordered pair is formed by selecting the first element of group N1, the second element of group N2, and the third element of group N3. Furthermore, one ordered pair is formed by selecting the second element of group N1, the third element of group N2, and the first element of group N3. Finally, one ordered pair is formed by selecting the third element of group N1, the first element of group N2, and the second element of group N3.

③ Three ordered pairs may be formed using the first element of group N1, the third element of group N2 and the second element of group N3, the second element of group N1, the first element of group N2 and the third element of group N3, and the third element of group N1, the second element of group N2 and the first element of group N3, respectively.

The above steps ①, ② and ③ are generalized for the elements of n groups each having n elements, that is, $n^2$ elements.

① A (k+(m−1)*0)th element is selected from each mth group (k is changed to 1, 2, . . . , or n).

② A (k+(m−1)*1)th element is selected from each mth group (k is changed to 1, 2, . . . , or n).

③ A (k+(m−1)*2)th element is selected from each mth group (k is changed to 1, 2, . . . , or n). . . .

ⓝ A (k+(m−1)*(n−1))th element is selected from each mth group (k is changed to 1, 2, . . . , or n).

Through the above-described steps ①~ⓝ, a total of $n^2$ ordered pairs are formed.

The fact that, when n is a prime number, two arbitrary elements of different groups appear in each of the $n^2$ ordered pairs exactly once can be demonstrated using 'I.1. Features of prime numbers' as follows:

The elements of each group are not included in the same ordered pair. Next, it is assumed that a (k1)th element of a m1(th) group and the (k2)th element of an (m2)th group exist in the same ordered pair (m1≠m2, k1≠k2, and m1, m2, k1 and k2 are arbitrary numbers of 1~n). If generation is made at the jth sequential position during the above steps ①~ⓝ, (m2−m1)×(j−1)≡k2−k1 (mod n) is established. For fixed m1, m2, and k1, k2 satisfying them is unique, therefore every element and an element, belonging to an arbitrary different group, exist in the same ordered pair exactly once.

3 Idea for Extension to Higher $(n^a, n^{2a-2}, n^{a-1}, n, 0, 1)$-Design 3.1 Conception for $(n^3, n^4, n^2, n, 0, 1)$-Design The $n^2 \times n^2$ algorithm demonstrated in 2.2 is used.

Since $n^3=n^2 \times n$, the number of PBIBD ordered pairs for $n^3 \times n^3$ is thought to be (the number of cases where n groups can be selected from among $n^2$ groups without overlapping=$n^2$)×(the number of n-tuple ordered pairs that can be formed using selected n groups, that is, $n^2$ elements=$n^2$).

Figure 2A:
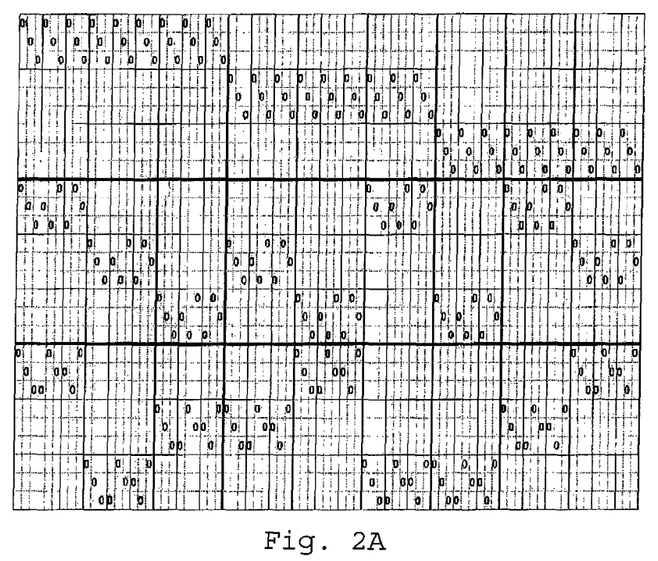
FIG. 2A is a diagram showing the implementation of the algorithm of the present invention for up to $n^3$ in the case where n=3.
Figure 2B:
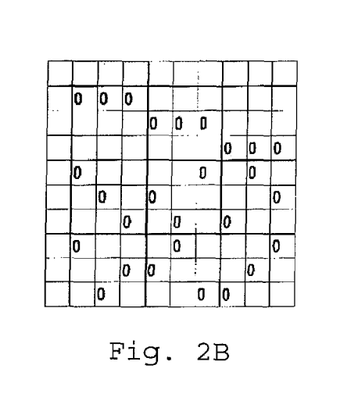
FIG. 2B is a diagram showing n different column direction arrangements that are selected from $n^2$ groups in a row direction.
Figure 2C:
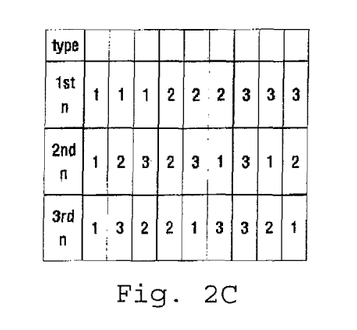
FIG. 2C is a diagram showing a group of n different index matrix groups that are selected as described above.

The case where n=3 is illustrated in FIG. 2.

The table of FIG. 2A shows the compete implementation of the algorithm for up to $n^3$. To help understanding, n is set to 3 (n=3). The table of FIG. 2B (which does not represent an $n^2 \times n^2$ basic matrix) shows n different column direction arrangements that are selected from $n^2$ groups in a row direction. The table of FIG. 2C represents a group of n different index matrixes that are selected as described above. A total of $n^2$ elements indicate numerals that must be connected with the type matrixes_i_j generated from the $n^2 \times n^2$ matrix of an immediately previous step.

3.2 Algorithm for Extended Model ($n^a$, $n^{2a-2}$, $n^{a-1}$, n, 0, 1) Based on Induction Method When the order increases as for $n^4$, and $n^5$, the sub-matrixes of the index matrix and the existing order model matrix are used. A related algorithm is described below.

3.2.1 Basis of Induction Method

Figure 3:
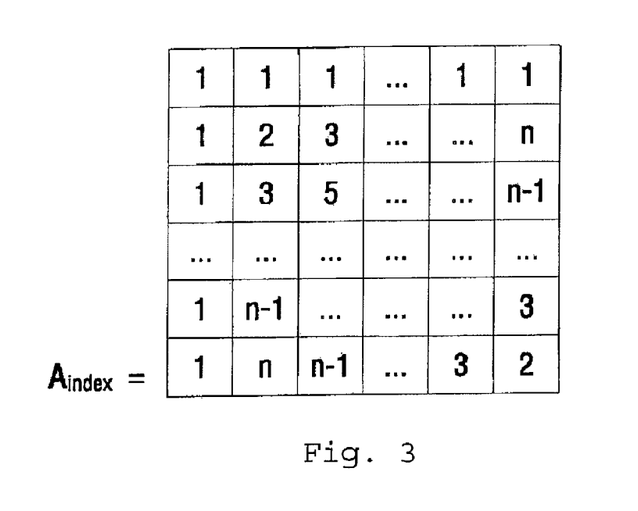
FIG. 3 is a diagram showing the typical structure of an index matrix that is required at the time of designing an ($n^2$, $n^2$, n, n, 0, 1)

The algorithm used in '2. Idea for generation of $n^2 \times n^2$ matrix' is used without change. In this case, required matrixes are an n×n-sized index matrix $A_{index}$ and n n×n-sized matrixes $M_1 \sim M_n$. The size of a resulting matrix is n2×n2. FIG. 3 shows the typical structure of the index matrix. 1, 2, . . . , and n are replaced with $M_1, M_2, \ldots,$ and $M_n$. Since the size of $M_i$ is n×n, a total of $n^2$ cases are formed.

Assuming that $(M_1)_{ij}$ is the element that is located in the ith row and jth column of $M_1$, when $(M_k)_{ij}=1$ (for j=i+(k-1))=0 (for the other cases), $M_1$ has the structure in which there is 1 in a diagonal direction and the other elements are all 0, and $M_2$ has the structure in which $M_1$ has been moved below by one row.

3.2.2. Induction Method

Figure 4:
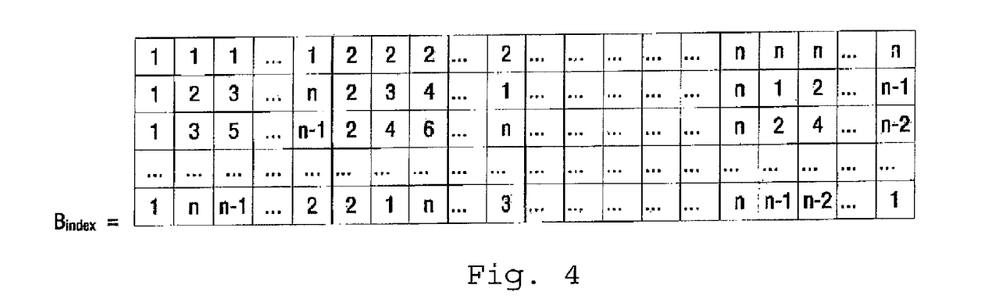
FIG. 4 is a diagram showing the typical structure of an index matrix that is required at the time of designing an ($n^a$, $n^{2a-2}$, $n^{a-1}$, n, 0, 1) design, exclusive of the ($n^2$, $n^2$, n, n, 0, 1) design.

The ($n^a$, $n^{2a-2}$, $n^{a-1}$, n, 0, 1)-design, other than ($n^2$, $n^2$, n, n, 0, 1)-design, requires an $n \times n^2$-sized index matrix $B_{index}$ and n $n^{a-2} \times n^{2a-4}$-sized sub-matrixes $M_1 \sim M_n$ obtained for the order lower than the reference order by one. FIG. 4 shows the typical structure of the index matrix $B_{index}$.

Figure 5:
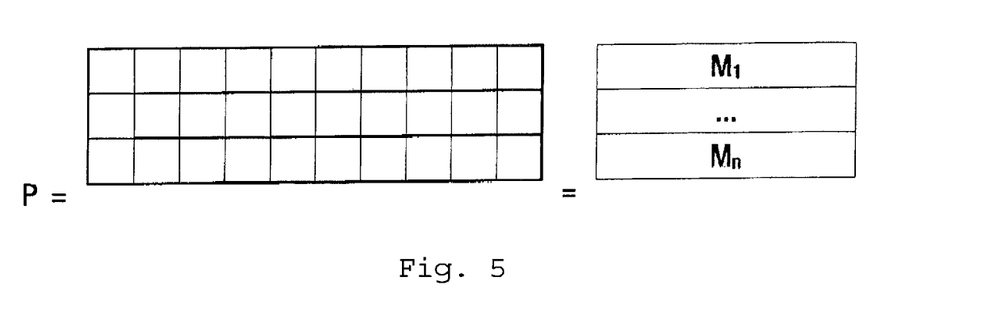
FIG. 5 is a diagram showing a process of generating a sub-matrix from a matrix P representing the $(n^a, n^{2a-4}, n^{a-2}, n, 0, 1)$ design of a previous step at the time of design.

Assuming that the matrix representing ($n^a$, $n^{2a-4}$, $n^{a-2}$, n, 0, 1) at the previous step is P, P is formed as shown in FIG. 5.

It is assumed that sub-matrixes obtained by equally dividing P by n with respect to row are $M_1, \ldots,$ and $M_n$. The size of Mk is $n^{a-2} \times n^{2a-4}$.

When each cell of $B_{index}$ is $n^{a-1} \times n^{2a-4}$ and the numeral of $(B_{index})ij$ is k, this means that $M_i$ is substituted for the row of $(n^{a-2}) \times (k+1)$ (that is, a sub-matrix having a size of $n^{a-2} \times n^{2a-4}$) at $(n^{a-2}) \times k+1$ of each cell of $B_{index}$. The other elements are all 0. In more detail, each cell of $B_{index}$ is replaced with a type_i_j matrix that is generated at step ② of "II. Algorithm", and the size of the type_i_j matrix is $n^{a-1} \times n^{2a-4}$. It means that sub-matrixes $M_i$ having a size of $n^{a-2} \times n^{2a-4}$ are substituted for $((n^{a-2}) \times (k-1)+1)$th to $((n^{a-2}) \times k)$th rows, which belong to the $n^{a-1}$ rows of the type_i_j matrix according to k, that is, the element of $(B_{index})ij$. The portions of the $n^{a-1}$ rows, which are replaced with the elements of sub-matrixes, are $n^{a-2} \times n^{2a-4}$, and the other elements are filled with 0.

That is, at the step of each order, index matrix $B_{index}$ having a common size of $n \times n^2$ and n sub-matrixes, obtained by dividing a matrix based on the model of a previous step by n on the basis of rows, are required.

II. Algorithm

An algorithm for generating anti-collusion codes using a GD PBIBD according to the present invention includes the following two steps.

① Generation of Basic $n^2 \times n^2$ Matrix

It is assumed that n is a prime number. Then, n different progressions $\{Si_j\}$ with Si=[1+(i-1)*(j-1)] mod n (for i, j=1, 2, . . . , and n) can always be obtained. Furthermore, for every i, j, the difference between $Si_j$ and $Si_{j+1}$ is i-1. Using this fact, an n×n index matrix having a numerical arrangement, as shown in FIG. 3, is obtained.

In FIG. 3, a type_i matrix is connected to the location of each number i in an index matrix. A description of n type_i matrixes is given as follows:

The type_i matrix is an n×n matrix. (i=1, 2, and n)

type_1 matrix: If a diagonal entry is 0,
  the others are 1 type_i matrix: matrix obtained by moving all columns of the type_(i-1) matrix to the left once An algorithm for generating the type_i matrix is realized in the following simple form:

for k from 0 to n-1
for j from 0 to n-1
if k≡(j+i-1) (mod n)
t_2[k][i]=0

An $n^2 \times n^2$ basic matrix is obtained by attaching a type_i matrix, having value i identical to each element of an index matrix (similar to that of FIG. 3), to the location of the element.

Figure 6:
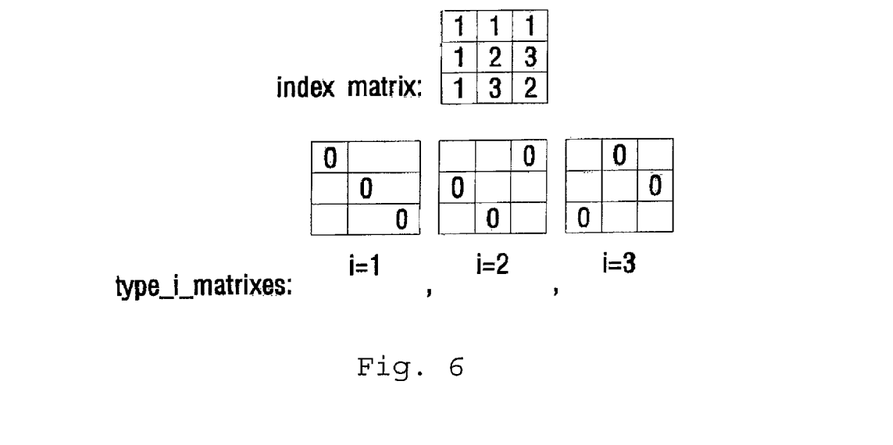
FIG. 6 is a diagram showing an embodiment of a 3×3 index matrix and type matrixes in the case where n=3, at the step of generating an $n^2 \times n^2$ basic matrix.
Figure 7:
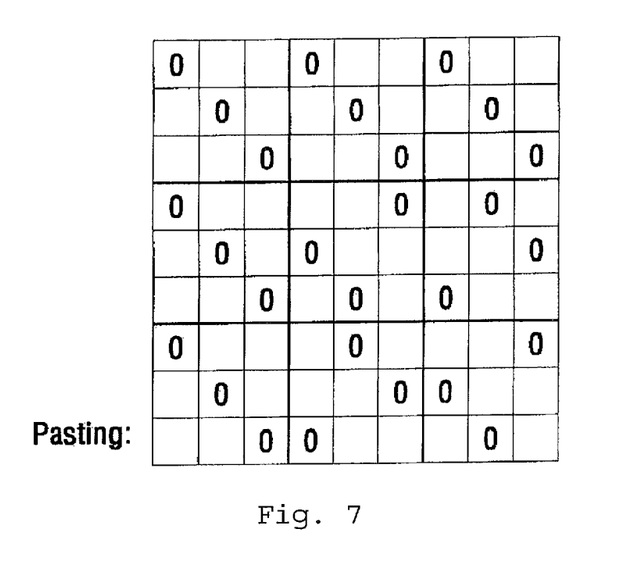
FIG. 7 is a diagram showing a complete $(n^2, n^2, n, n, 0, 1)$ design in the case where n=3.

For example, in the case of n=3, an n×n index matrix and type matrixes are formed as shown in FIG. 6 ('1' to be entered into each blank cell is omitted in order to clearly illustrate the differences between n type_i matrixes). FIG. 7 shows a complete $n^2 \times n^2$ basic matrix that is obtained by connecting the index matrix with corresponding type_i matrixes.

② Extension to $n^k \times n^{2k-2}$ Matrix (k=3, 4, . . . , and a)

At this step, n index matrixes (similar to those at FIG. 8) are required.

An algorithm for generating the above matrixes is described as follows:

for h from 1 to n
for i from 0 to n-1
for j from 0 to n-1
  index[i][j]=(h+ij) % n;
  however, in the case where a resulting value is 0, n The type matrixes that will be connected to respective elements of n types of index matrixes (similar to those of FIG. 8) are different from those at the step ①. Here, $n^2$ type_j matrixes are required. i and j are used for indices. A description of the type_i_j matrix(type_i_j matrix) is given as follows:

the type_i_j matrix is $n^{k-1} \times n^{2k-4}$ matrix. (i, j=1, 2, . . . , and n)

index i indicates the location of $n^{k-2} \times n^{2k-4}$ sub-matrix_j in the $n^{k-1} \times n^{2k-4}$ matrix.

That is, index i indicates the location of a corresponding one of first to nth $n^{k-2} \times n^{2k-4}$ matrix regions, with an $n^{k-1} \times n^{2k-4}$ matrix having an element value of 1 being divided to the n matrixes on the basis of rows.

index j indicates a corresponding one of a total of n generated $n^{k2} \times n^{2k-4}$ sub-matrixes_j.

A description of a total of n $n^{k-2} \times n^{2k-4}$ sub-matrixes_j is given as follows:

The sub-matrix_j is a jth $n^{k-2} \times n^{2k-4}$ matrix portion (from the top) that is separated from the entire matrix that is generated at the entire matrix generation step for the immediate previous order.

Figure 9:
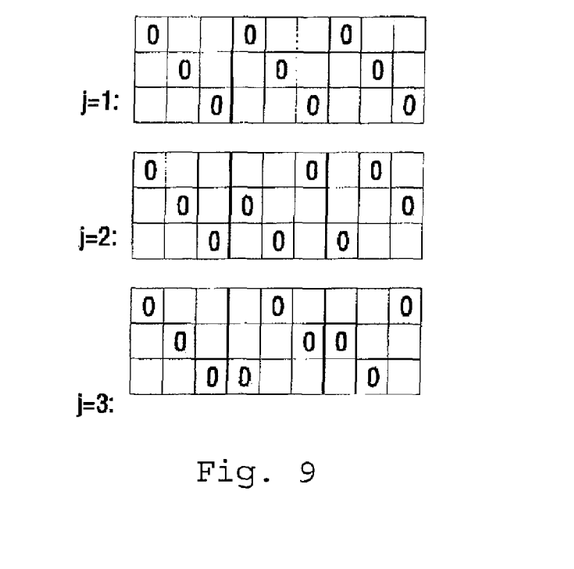
FIG. 9 is a diagram showing an embodiment of $n^{k-2} \times n^{2k-4}$ sub-matrixes_j in the case where n=3 and k=3.

For example, for n=3, there are 3 sub-matrixes_j. These sub-matrixes_j are jth $n \times n^2$ matrix portions (similar to those of FIGS. 7 and 9) that are separated from a $3^2 \times 3^2$ matrix at the step immediately before extension to the current $n^3 \times n^4$ matrix and are then numbered.

Subsequently to the previous example for n=3, $n^2$ type_i_j matrixes (similar to is those of FIG. 9) in which n sub-matrixes_j are ith locations are generated. Although '1' must be entered into blank cells, '1' is omitted for convenience.

Figure 8:
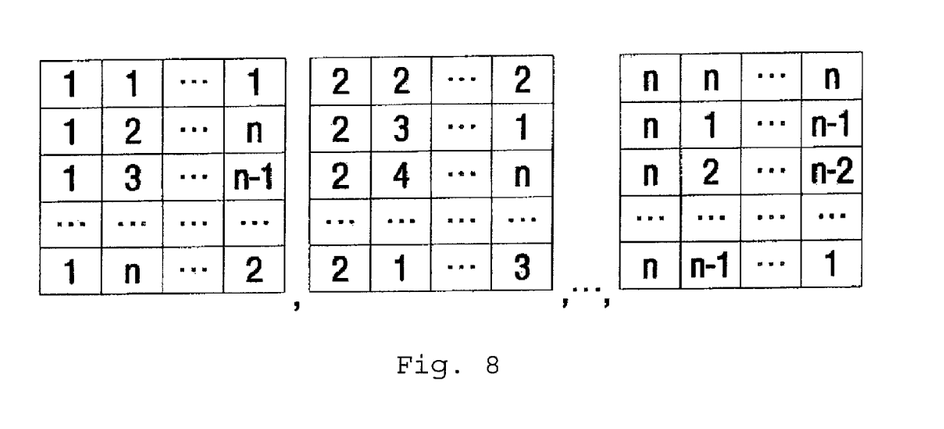
FIG. 8 is a diagram showing an embodiment of index matrixes that are required at the time of designing an $(n^a, n^{2a-2}, n^{a-1}, n, 0, 1)$ design, exclusive of an $(n^2, n^2, n, n, 0, 1)$ design, in the case where n=3.
Figure 10:
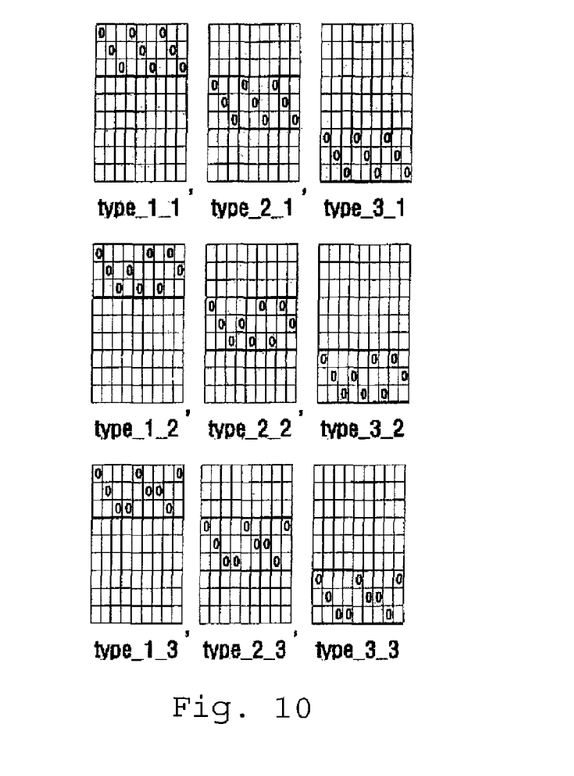
FIG. 10 is a diagram showing an embodiment in which type matrixes are generated using sub-matrixes_j in the case where n=3.

Now, how to connect the $n^2$ type_i_j matrix, generated as shown in FIG. 10, to the $n^k \times n^{2k-2}$ matrix is described. This is a method of attaching the type_i_j matrixes to the n index matrixes, which have been already formed as shown in FIG. 8, while indices coincide with corresponding indices.

Figure 11:
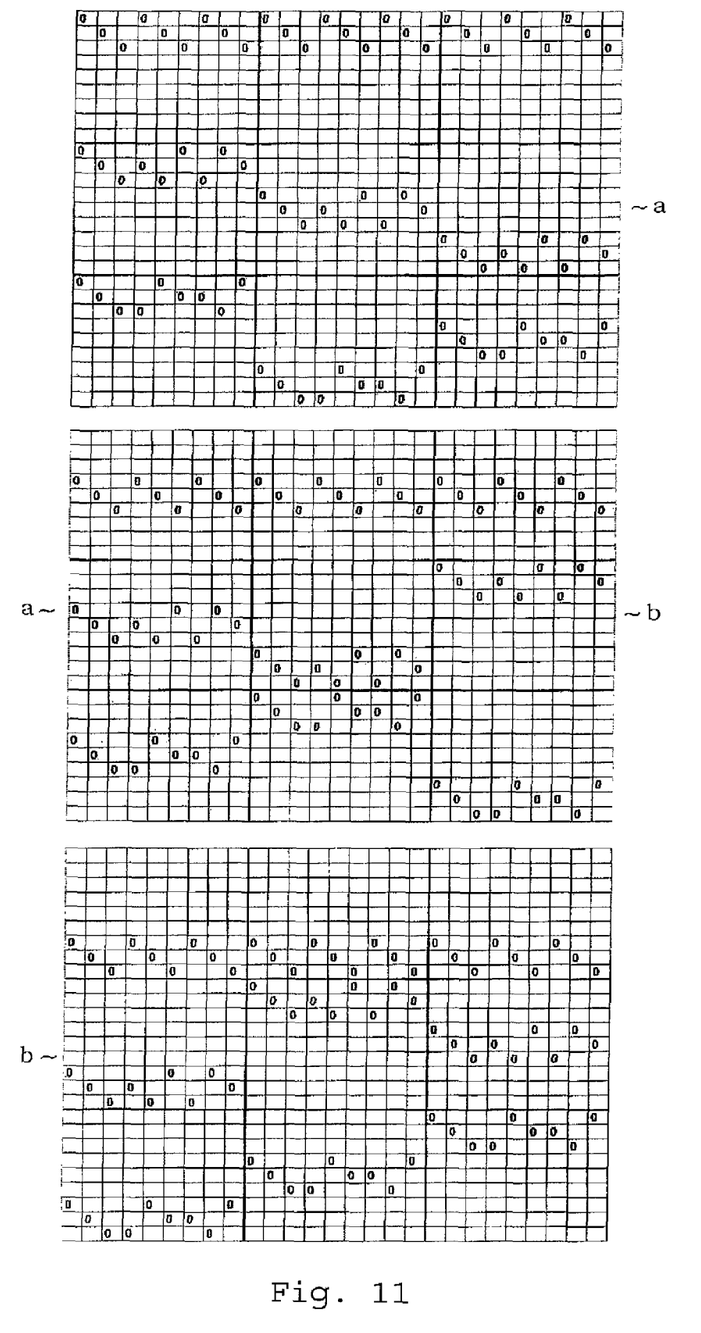
FIG. 11 is a diagram showing an example of a complete $n^3 \times n^4$ matrix in the case where n=3.

First, a single macro-sized $n \times n^2$ index matrix is formed by connecting n index matrixes in a lateral direction. The row of the macro-sized index matrix where one arbitrary element is located is indexed using variable q, and variable p designates a number identical to the element value in the macro-sized index matrix. Furthermore, the type_i_j matrix is connected to the location of each element of the macro-sized index matrix, which satisfies p=i and q=j. More precisely, the type_i_j matrix is attached to the location. By doing so, the $n^{k-1} \times n^{2k-4}$ type_i_j matrixes fill columns n times and fill rows $n^2$ times in a manner suitable for the structure of the macro-sized index matrix, therefore the $n^k \times n^{2k-2}$ matrix is formed at each order step (k=3, 4, . . . , and a). For example, the $n^3 \times n^4$ matrix generated for n=3 is shown in FIG. 11. In the same manner, '1' exists in the cells of the other elements, even though they are blanked for convenience. In the case where a is equal to or larger than 4, the step (2 is repeated until k=a.

A column of the matrix, generated as shown in FIG. 11, is distributed to each, and is used as an anti-collusion fingerprint code.

Figure 12:
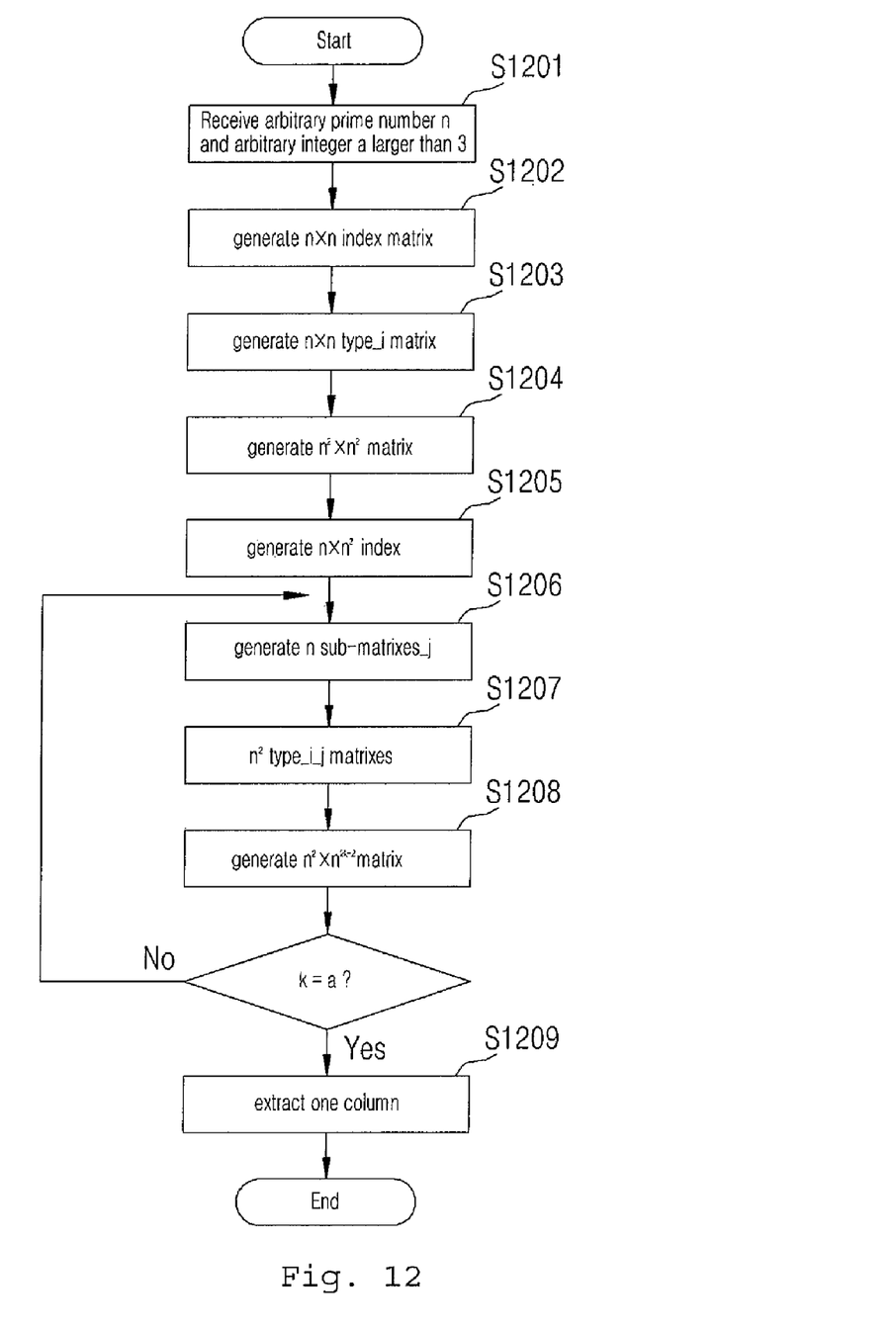
FIG. 12 is a flowchart showing a method of generating fingerprint codes according to an embodiment of the present invention.

FIG. 12 is a flowchart showing a method of generating fingerprint codes according to an embodiment of the present invention.

First, an arbitrary prime number n and an arbitrary integer a larger than 3 are received at step S1201.

Thereafter, an n×n index matrix is generated at step S1202.

Thereafter, n n×n type_i matrixes are generated at step S1203.

Thereafter, an $n^2 \times n^2$ matrix is generated using the n×n index matrix and the n×n type_i matrixes at step S1204.

Thereafter, an $n \times n^2$ index matrix is generated at step S1205.

Thereafter, in order to obtain an $n^a \times n^{2a-2}$ matrix, that is, a desired final matrix, a repetitive process is performed. That is, the $n^a \times n^{2a-2}$ matrix is generated based on an $n^{a-1} \times n^{2a-4}$ matrix by repeating a process of generating an $n^k \times n^{2k-2}$ matrix based on an $n^{k-1} \times n^{2k-4}$ matrix until k becomes a, using a stepwise method of generating an $n^3 \times n^4$ matrix based on the $n^2 \times n^2$ matrix and generating an $n^4 \times n^6$ matrix based on the $n^3 \times n^4$ matrix. Here, k is an integer ranging from 3 to a, and the repetitive process is performed using k value that starts from 3 and increases by 1 after the following third step.

At the first step of the repetition step, n $n^{k-2} \times n^{2k-4}$ sub matrixes_j are generated from the $n^{k-1} \times n^{2k-4}$ matrix generated at the previous step at step S1206.

At the second step thereof, $n^2$ $n^{k-1} \times n^{2k-4}$ type_i_j matrixes are generated using the sub matrixes_j at step S1207.

At the third step thereof, an $n^k \times n^{2k-2}$ matrix is generated using the $n \times n^2$ index matrix and the $n^{k-1} \times n^{2k-4}$ type_i_j matrixes at step S1208. An $n^a \times n^{2a-2}$ matrix, which is a desired final matrix, can be obtained by performing the above repetition process until k becomes a.

Finally, one arbitrary column is extracted from the $n^a \times n^{2a-2}$ matrix at step S1209.

According to the present invention, the computer algorithm is implemented based on the PBIBD model that has existed only in theory, so that fingerprint codes can be easily and rapidly generated as desired, and fingerprint codes based on a model infinitely extended for the value k of ($n^k$, $n^{2k-2}$, $n^{k-1}$, n, 0, 1) GD-PBIBD can be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer implemented method of generating anti-collusion fingerprint codes using a ($n^a$, $n^{2a-2}$, $n^{a-1}$, n, 0,1) GD-PBIBD, the fingerprint codes being generated on a computer usable medium having a computer readable program code embodied therein, said computer readable program code adapted to be executed to implement a method for generating the fingerprint codes for use with digital media for the protection of copyrights associated with said digital media, the computer implemented method comprising:
    providing a computer system, wherein the system comprises the computer usable medium with the computer readable program code being executed to perform the following steps:
    step 1 of electronically receiving, by said computer system, an arbitrary prime number n and an arbitrary integer a larger than 3;
    step 2 of automatically generating, by said computer system, an n×n index matrix;
    step 3 of automatically generating, by said computer system, n n×n type_i matrixes;
    step 4 of automatically generating, by said computer system, an $n^2 \times n^2$ matrix using the n×n index matrix and the n×n type_i matrixes;
    step 5 of automatically generating, by said computer system, an $n^a \times n^{2a-2}$ matrix;
    step 6 of automatically extracting, by said computer system, one arbitrary column from the $n^a \times n^{2a-2}$ matrix, wherein the one arbitrary column extracted at the step 6 forms a fingerprint code; and
    inserting said fingerprint code into digital content for protecting copyrights of said digital content.

2. The method as set forth in claim 1, wherein the step 5 comprises:
    step 5-1 of automatically generating, by said computer system, an $n \times n^2$ index matrix; and
    step 5-2 of automatically generating, by said computer system, the $n^a \times n^{2a-2}$ matrix based on an $n^{a-1} \times n^{n2a-4}$ matrix by repeating a process of automatically generating, by said computer system, an $n^k \times n^{2k-2}$ matrix based on an $n^{k-1} \times n^{2k-4}$ matrix until k becomes a, in a stepwise manner in which an $n^3 \times n^4$ matrix is automatically generated based on the $n^2 \times n^2$ matrix and an $n^4 \times n^6$ matrix is automatically generated based on the $n^3 \times n^4$ matrix, where k is an integer ranging from 3 to a.

3. The method as set forth in claim 2, wherein the $n^k \times n^{2k-2}$ matrix of respective order steps at the step 5-2 is automatically generated through:
    step a of automatically generating, by said computer system, n $n^{k-2} \times n^{2k-4}$ sub matrixes_j from the $n^{k-1} \times n^{2k-4}$ matrix generated at the previous step;
    step b of $n^2$ $n^{k-1} \times n^{2k-4}$ type_i_j matrixes using the sub matrixes_j; and
    step c of automatically generating, by said computer system, an $n^k \times n^{2k-2}$ matrix using the n×n² index matrix of the step 5-1 and the $n^{k-1} \times n^{2k-4}$ type_i_j matrixes.

4. The method as set forth in claim 1, wherein the index matrix automatically generated at the step 2 is formed such that all element values of a first column are 1, and values of other element values, that is, $S_{i(j+}1)$, are $S_{ij}+(i-1)$, where i indicates a row, j indicates column, and i and j are integers each in a range from 1 to n, and respective element values are based on recurring numeral arrangement ranging from 1 to n, that is, a value larger than n by 1 is 1 and a value larger than n−1 by 2 is 1.

5. The method as set forth in claim 1, wherein the type_i matrixes automatically generated at the step 3 include n matrixes (type_1, type_2, ..., and type_n), i value of which is an integer ranging from 1 to n, each of the type_i matrixes is generated using the following algorithm, and remaining elements are 1:

[Algorithm 1]
    for k from 0 to n−1
    for j from 0 to n−1
      if k≡(j+i−1)(mod n)
        t_2[k][j]=0.

6. The method as set forth in claim 1, wherein the $n^2 \times n^2$ matrix automatically generated at the step 4 is formed by attaching each of the type_i matrixes, automatically generated at the step 3, to a location of an element of the index matrix automatically generated at the step 2, the type_i matrix having i value identical to a value of the element.

7. The method as set forth in claim 2, wherein the $n \times n^2$ index matrix automatically generated at the step 5-1 is formed using the following algorithm:

[Algorithm 2]
    for h from 1 to n
      for i from 0 to n−1
        for j from 0 to n−1
          index[i][j]=(h+i×j) MOD n.

8. The method as set forth in claim 3, wherein the $n^{k-2} \times n^{2k-4}$ sub-matrix_j automatically generated at the step a is any of n $n^{k-2} \times n^{2k-4}$ sub-matrixes that are obtained by dividing the $n^{k-1} \times n^{2k-4}$ matrix by n, with every $n^{k-2}$ rows of the $n^{k-1} \times n^{2k-4}$ matrix, raging from a first row to an $(n^{k-1})$th row, being grouped into a group.

9. The method as set forth in claim 8, wherein j value of the sub-matrix_j has an integer ranging from 1 to n, and the j value indicates a jth one of the n $n^{k-2} \times n^{2k-4}$ sub-matrixes on a basis of a first row.

10. The method as set forth in claim 3, wherein the $n^{k-1} \times n^{2k-4}$ type_i_j matrix automatically generated at the step b is formed by attaching a sub-matrix $\overline{\phantom{i}}$ j of n sub-matrixes, which has j value identical to j value of the type_i_j matrix, the n sub-matrixes being obtained by dividing the $n^{k-1} \times n^{2k-4}$ matrix having an element value of 1 by n, with every $n^{k-2}$ rows of the $n^{k-1} \times n^{2k-4}$ matrix, ranging from a first row to an $n^{k-1}$ row, being grouped into a group, where i and j are integers each ranging from 1 to n.

11. The method as set forth in claim 3, wherein the $n^k \times n^{2k-2}$ matrix automatically generated at the step c is formed by attaching an $n^{k-1} \times n^{2k-4}$ type_i_j matrix to a location of each element of the $n \times n^2$ index matrix, the $n^{k-1} \times n^{2k-4}$ type_i_j matrix, satisfying p=i and q=j when a value of the element, is variable p and a row of the element is indicated by variable q, where p, q, i, and j are integers each ranging from 1 to n.

* * * * *